Nov. 3, 1959     H. A. JUBEL     2,911,269
TRUNK PISTON
Filed Jan. 13, 1958

INVENTOR
HENRY A. JUBEL
By Bruninga & Sutherland
ATTORNEYS.

United States Patent Office 2,911,269
Patented Nov. 3, 1959

2,911,269

TRUNK PISTON

Henry A. Jubel, St. Louis County, Mo., assignor to Sterling Aluminum Products, Inc., St. Charles, Mo., a corporation of Missouri Application January 13, 1958, Serial No. 708,434

8 Claims. (Cl. 309—13)

This invention relates to trunk pistons, particularly of a type designed for use in internal combustion engines for automobiles. Such pistons are usually constructed of a metal of relatively high thermal expansion, such as aluminum and magnesium alloys containing various alloying elements such as copper, silicon, nickel, manganese, etc. Where silicon is employed on the order of 9%, the thermal expansion is materially reduced. Copper, nickel and manganese impart hardness and strength to the alloy and an aluminum alloy may contain magnesium. The temperatures encountered in internal combustion engines are however, high, so that there is liability of seizure of the piston when hot and a looseness when cold.

A trunk piston of the type described comprises a head, a skirt, and wrist pin bosses on the inside of the skirt. The head is grooved to receive the piston rings and is of smaller diameter than the skirt, which latter provides the guiding cross-head for the piston. The skirt is separated from the head in one or both regions of the thrust faces by circumferential slots. The skirt may be of circular contour but is usually made oval with the major diameter in the regions of the thrust faces and with the minor diameter in the regions of the bosses. Some pistons have vertical slots. Furthermore, the piston is also relieved in the regions of the bosses. The skirt is usually given a standard taper with a smaller diameter at the top.

One of the objects of this invention is to provide a piston of the type described whereby the expansion of the piston may be controlled so as to maintain a close fit in the cylinder, whether the piston be hot or cold.

Further objects will appear from the detailed description in which will be set out an illustrative embodiment of this invention; it is to be understood however, that this invention is susceptible of various embodiments within the scope of the appended claims.

Referring to the drawing, Figure 1 is a side view of a piston embodying this invention;

Figure 1:
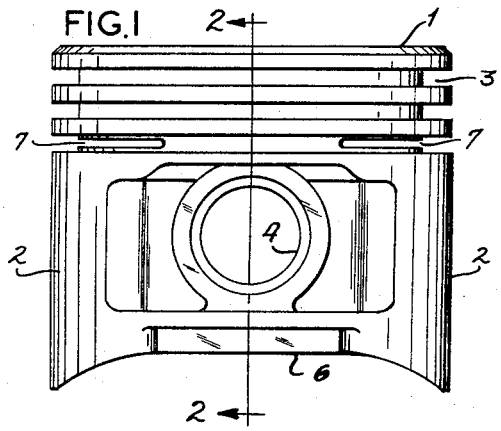

Generally stated, and in accordance with an illustrative embodiment of this invention, a trunk piston of a metal of relatively high thermal expansion and comprising, a head, a skirt provided with wrist pin bosses, and with thrust faces axially separated from the head in one or both thrust face regions, is provided with a pair of control elements of a metal of relatively low thermal expansion, lying within and extending around the top of the skirt in the regions of the bosses but partially into thrust face regions, rigidly cast anchored in the regions of the bosses, but unanchored radially in the regions of the thrust faces. Each element is anchored in a boss region and extends for a substantial distance circumferentially but only partially into the separated thrust face regions, and is unanchored radially therein. The adjacent ends of the elements in the separated thrust face region terminate at a substantial distance circumferentially from each other, viz. in the illustrated embodiment through an arc of 30°. In the illustrated embodiment described, the skirt is connected to the head in the regions of the thrust faces, except for the circumferential slot or slots, and the skirt extends below the control elements continuously from the boss region or regions to the thrust face region or regions. The control elements may be of greater rigidity axially in the regions of the bosses than in the regions of the thrust faces. In the embodiment described, the dimensions of the control elements are relatively narrow axially in the regions of the thrust faces, but may be relatively wider axially in the regions of the bosses.

In the method of making such a trunk piston, the head and skirt of the high thermal expansion casting metal, are cast over the control elements of relatively low thermal expansion, positioned inside of the skirt with the piston metal surrounding and anchoring the elements radially in the regions of the bosses, but leaving the elements exposed internally and unanchored radially in the regions of the thrust faces; thereafter the casting metal is permitted to solidify and cool so as to stress the casting metal and the elements; thereafter the skirt is separated axially from the head in one or both thrust face regions so as to cause the separated thrust face or faces to move outwardly; the piston is then finished in the usual manner; in an embodiment disclosed the skirt if finished transversely to oval form with the major diameter on the thrust face axis and the minor diameter on the wrist pin axis. Almost universally, such pistons are cast in permanent or metal molds, so as to require no machining at all on the inside of the piston and little machining on the outside of the piston.

In the piston described, the control elements are as noted above, of a metal of relatively low thermal expansion. They may be made of cold rolled steel which has about the same co-efficient of thermal expansion as has the cylinder wall. However, the control elements may be made of a steel or metal having a very low co-efficient of expansion, approaching zero. Such steel is well-known and has heretofore been employed as control elements for aluminum and magnesium alloy pistons.

Referring now to the accompanying drawing and more particularly to Figures 1–4, 1 designates the head and 2 the skirt of a piston of the type described. The head, which is made somewhat smaller than the skirt, is provided with packing ring grooves 3 while the skirt is provided with inwardly extending wrist pin bosses 4. There may also be ribs 5, extending from the bosses to the head to give additional strength. The skirt itself however, is made thin, particularly in the regions of the thrust faces and may also be externally relieved in the boss regions and provided at the bottom with the usual balancing lugs 6. The head is separated from the skirt in the regions of the thrust faces by semi-circumferential slots 7, but remains attached in the regions of the bosses. This slotting 7, may be on one or both sides of the piston.

Figure 3:
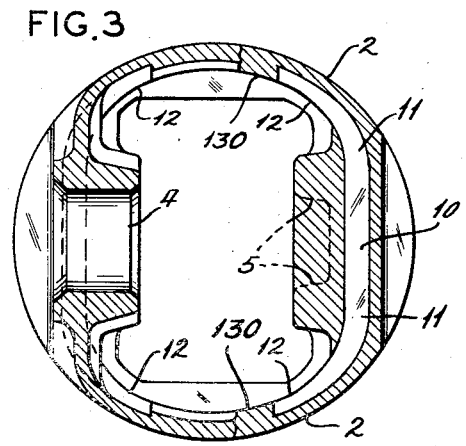
Figure 3 is a section on the line 3—3, Figure 2.

Referring to Figure 3, the control elements, generally indicated at 10, are made of a metal of relatively low thermal expansion. As shown, they are in the form of sectors which may be stampings. In the regions of the bosses the sectors are made of relatively high radial depth as shown at 11, but in the regions of the thrust faces the sectors are reduced to relatively low radial depths or tapered as shown at 12. The parts 11 of greater rigidity are cast in the wrist pin boss regions, while the parts 12 extend into the thrust face regions. As an example, each sector 10 may encompass an arc of about 165 degrees. The adjacent ends of the elements terminate a substantial distance circumferentially from each other and, as shown in Figs. 3 and 5, ledges 130 integral with the piston body are abutted by the adjacent ends of the elements.

Figure 2:
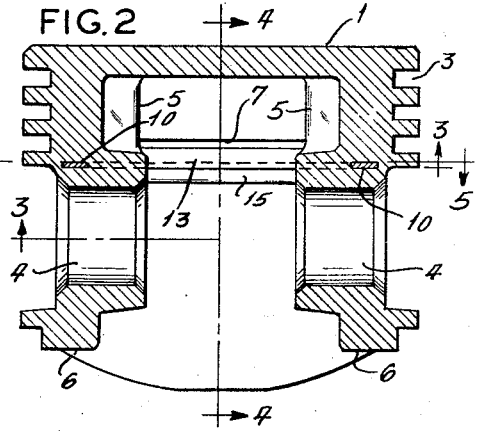
Figure 2 is a section on the line 2—2, Figure 1.
Figure 4:
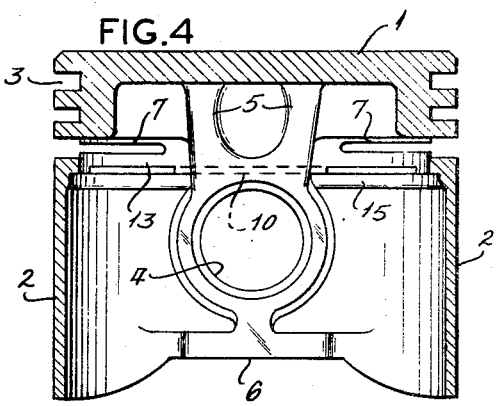
Figure 4 is a section on the line 4—4, Figure 2.

The control elements shown in Figure 3, and as just described, are cast into the piston in the position shown in Figures 2, 3 and 4. Their positions are at the top of the skirt and below the circumferential slots 7, later produced. In that position the control sectors are cast wholly within the metal of the skirt in the regions of the bosses and rigidly cast-anchored therein, but simply lie against the skirt and are radially unanchored in the regions of the thrust faces. In the piston above the sectors, there are ledges 13 which are reduced radially at the top vanishing into the thrust faces. Below the control sectors there are tapering ledges 15 from the bosses and vanishing into the centers of the thrust faces as shown in Figures 3, 4 and 5.

Figure 5:
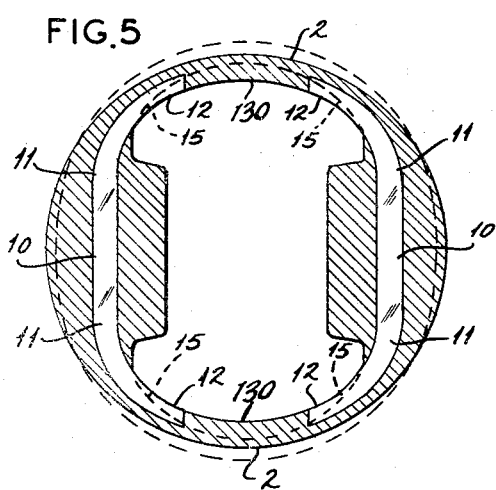
Figure 5 is a diagrammatical view on the line 5—5, Figure 2, and illustrating the principle of this invention.
Figure 6:
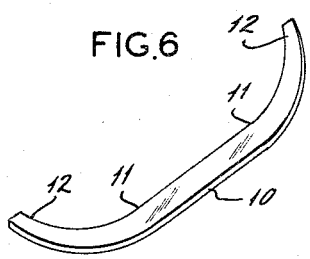
Figure 6 is a prospective view of one of the control elements or sectors.

Referring now to Figure 5, in making the piston the control sectors are placed in a mold in which the piston is to be cast with the sectors positioned at the top of what will form the skirt of the piston. To accomplish this, the sectors are placed on the usual core, which may be a five-piece core with a three-piece center core and a pair of side cores having recesses to form the wrist pin bosses, and which may be of a type shown in U.S. Patent 2,789,329. The core is recessed to receive the control sectors 10 which may be placed over the core when collapsed. At this time, however, the circumferential slots 7 will be absent, as will also be the ring grooves 3. At that time the skirt including the ledges 13 are a part of and connected to the head.

After the piston has been cast, but before the slots 7 are cut, the parts will be in the position shown in full lines in Figure 5; i.e., solidifying and cooling from molten to cold condition the casting metal will shrink much faster than will the steel sectors so that the piston metal will contract to finally arrive at a condition of tension. In so doing, the steel sectors are stressed, viz., placed under compression radially as well as circumferentially. When now the circumferential slots 7 are cut, the steel sectors and the piston metal will both move out so as to form an oval contour of the piston as shown in dotted lines in Figure 5, because the strain is partially relieved in the region of the thrust faces and particularly because the parts 12 at those faces are reduced in radial depth. However, the piston metal will remain partly under tension while the sectors will remain partly under compression and under radial stress. It will, of course be understood that the oval shown in exaggerated for illustrative purposes because the actual distortion is small, viz., a few thousandths of an inch. The piston is now machined to size with the skirt of the usual round, or oval contour; an oval form where employed, has its major diameter on the thrust face axis and its minor diameter on the wrist pin axis. Reliefs may however, be cast in the regions of the bosses as is usual in many pistons. The steel sectors will, however, remain oval (slightly) until in use in the engine, until then, the piston metal will remain partly under tension while the sectors will remain partly under compression.

A piston of the construction described and made as described can be made with a very low clearance and it will still maintain a close fit when either hot or cold. That is for the following reason: As the piston heats up the head will of course expand radially in all directions. Such radial expansion of the head will, however, only be transmitted to the skirt in the regions of the bosses. That will tend to relieve some of the strain along the wrist pin axis so that the piston metal and the steel sectors will move out along the axis. That will cause the sectors to tend to return to their original (viz., round or oval) form. In so doing, the strain in the piston metal at the thrust faces is also relieved so as to move in with the steel sectors at those faces. The piston, even one of an aluminum alloy, will therefore remain conformed to the cylinder with a very low clearance, even below 0.001 inch. The sectors 10 are rigidly cast anchored in the thrust faces because the metal is cast entirely therearound. Because of the construction of the sectors they take generally the form of cantilevers anchored in the boss regions and extending into the thrust face regions. The piston metal does not, however, surround the parts 12 but only lies against the outside of the parts and in the particular embodiment shown, against one of the sides (upper, Fig. 4) of those parts except for the tapering ledges 15 from the bosses and vanishing into the centers of the thrust faces on the (lower) side of the sectors. However, as will be seen from Fig. 3, the ledges 13 and 15 are very narrow, so that any gripping of the parts 12 and even into 10, by the ledges after solidification will be slight. Accordingly, the control sectors while anchored radially and axially in the regions of the bosses will be unanchored radially and axially in the regions of the thrust faces so that the thrust faces will always move in with the sectors as the piston temperature increases when in use in the engine. The control sectors at the thrust face or faces and the alloy thereover, are therefore under stress when the piston is cold, which stress will be progressively relieved as the piston heats up in the engine, the whole operating to maintain the skirt dimension radially. The skirt at the thrust faces will therefore remain accurately dimensioned by the control sectors.

The expansion of the piston may be accurately controlled by the dimensions of the sectors 10, the distance to which those sectors extend into the thrust faces, i.e., the spacing of the adjacent ends of the sectors in each thrust face, the thickness of the thrust faces, the composition of the aluminum alloy, and the composition of the sectors. The expansion of a given piston may be determined by placing the piston head down on a hot plate heated to a temperature of about 400° F. When the diametrically reduced head of a piston of, for instance, a diameter of 4.06 inches increases about 0.020 inch, measurements are taken at the diameters of the thrust faces, first at right angles to the wrist-pin bosses at the top, middle and bottom of the skirt, and then at 45° to the wrist-pin bosses at the top, middle and bottom of the skirt. Any undue bearing of the piston at any and all of the diameters given above can be corrected by varying the spacing of the adjacent ends of the sectors in a thrust face by varying the width of the parts 12 and by varying the thickness of the skirt at the thrust faces. Finally undue bearing at the 45° diameters can be reduced by oval grinding.

As an example of an actual embodiment, we can take a piston of a diameter of 4.06 inches and of a composition containing 9% silicon, 3.5% copper, 0.15% magnesium with the balance aluminum. The skirt thickness is 0.125 inch and the distance from the top of the piston to the top of the slot 7 is ⅞ inch, and the length of the skirt is 3.5 inches, and with the parts as shown drawn to scale. The sectors 10, are of cold rolled steel of a thickness of 0.07 inch, a radial width at 11 of 0.25 inch tapering to the end of parts 12 to 0.125 inch and with the distance between the ends of about the sectors in each thrust face subtending an arc of 30°, leaving the sectors each subtending an arc of 165°. After casting and upon cutting of the one slot 7, the top of the skirt will move out at the center of the thrust face 0.010 inch and upon cutting of both slots 7, the top of the skirt will move out twice that amount, i.e., 0.020 inch. The skirt can now be machined to cylinder dimensions either to a round or to an oval contour with the major diameter at the thrust axis. In an embodiment disclosed the skirt is finished transversely to oval form with the major diameter on the thrust face axis and the minor diameter on the wrist pin axis; for that will prevent undue bearing of the skirt on the 45° diameters. The above will produce a piston which will be accurately controlled when in use in an engine.

It will therefore be seen that the invention accomplishes its purpose. A piston is provided which can be closely fitted to a cylinder of an internal combustion engine and which will maintain its dimensions from hot to cold so that there will be no seizing when hot and no slapping when cold. By spacing the ends 12 of the sectors in the thrust faces, the piston is rendered flexible in that spacing, so that undue pressure thereof is reduced, and as noted above, that flexibility may be increased by reducing the radial width of the ledges 13 between the ends 12 of the sectors. The ledges 13 may be tapered as are the ledges 15 to the centers of the thrust faces.

Having thus described the invention, what is claimed and desired to be secured by Letters Patent is:

1. A trunk piston of a metal of relatively high thermal expansion, comprising, a head, a skirt provided with wrist pin bosses and with thrust faces, one of which is axially separated from the head in a thrust face region, and a pair of control elements of a metal of relatively low thermal expansion lying within and at the top of the skirt below the separation of the thrust face from the head, each element being anchored in a boss region and extending for a sustantial distance circumferentially along but only partially into the separated thrust face region but being unanchored radially therein.

2. A trunk piston of a metal of relatively high thermal expansion, comprising, a head, a skirt provided with wrist pin bosses and with thrust faces, each of which is axially separated from the head in a thrust face region, and a pair of control elements of a metal of relatively low thermal expansion lying within and at the top of the skirt below the separation of the thrust face from the head, each element being anchored in a boss region and extending for a substantial distance circumferentially along but only partially into the separated thrust face regions but being unanchored radially therein.

3. A trunk piston of a metal of relatively high thermal expansion, comprising, a head, a skirt provided with wrist pin bosses and with thrust faces one of which is axially separated from the head in a thrust face region, and a pair of control elements of a metal of relatively low thermal expansion lying within and at the top of the skirt below the separation of the thrust face from the head, each element being anchored in a boss region and extending for a substantial distance circumferentially along but only partially into and circumferentially along the separated thrust face region and radially reduced therein but unanchored radially therein.

4. A trunk piston of a metal of a relatively high thermal expansion, comprising, a head, a skirt provided with wrist pin bosses and with thrust faces one of which is axially separated from the head in a thrust face region, and a pair of control elements of a metal of relatively low thermal expansion lying within and at the top of the skirt below the separation of the thrust face from the head, each element being anchored in a boss region and extending for a substantial distance circumferentially along but only partially into the separated thrust face region but unanchored radially therein, the adjacent ends of the elements in the separated thrust face region terminating at a substantial distance circumferentially from each other.

5. A trunk piston of a metal of relatively high thermal expansion, comprising, a head, a skirt provided with wrist pin bosses and with thrust faces, one of which is axially separated from the head in a thrust face region, and a pair of control elements of a metal of relatively low thermal expansion lying within the skirt and relatively narrow axially of the piston, each element being anchored in a boss region and extending for a substantial distance circumferentially along but only partially into the separated thrust face region but being unanchored radially therein.

6. A trunk piston of a metal of relatively high thermal expansion, comprising, a head, a skirt provided with wrist pin bosses and with thrust faces, one of which is axially separated from the head in a thrust face region, the skirt being transversely oval with the major diameter on the thrust face axis and the minor diameter on the wrist pin axis, and a pair of control elements of a metal of relatively low thermal expansion lying within and at the top of the skirt below the separation of the thrust face from the head, each element being anchored in a boss region and extending for a substantial distance circumferentially along but only partially into the separated thrust face region but being unanchored radially therein.

7. A trunk piston of a metal of relatively high thermal expansion, comprising, a head, a skirt provided with wrist pin bosses and with thrust faces, each of which is axially separated from the head in a thrust face region, the skirt being transversely oval with the major diameter on the thrust face axis and the minor diameter on the wrist pin axis, and a pair of control elements of a metal of relatively low thermal expansion lying within and at the top of the skirt below the separation of the thrust face from the head, each element being anchored in a boss region and extending for a substantial distance circumferentially along but only partially into the separated thrust face regions but being unanchored radially therein.

8. A trunk piston of a metal of relatively high thermal expansion, comprising, a head, a skirt provided with wrist pin bosses and with thrust faces one of which is axially separated from the head in a thrust face region, and a pair of control elements of a metal of relatively low thermal expansion lying within and at the top of the skirt below the separation of the thrust face from the head, each element being anchored in a boss region and extending for a substantial distance circumferentially along but only partially into the separated thrust face region but unanchored radially therein, the adjacent ends of the elements in the separated thrust face region terminating at a substantial distance circumferentially from each other, ledges on the piston body being abutted by the adjacent ends of the elements.

References Cited in the file of this patent

UNITED STATES PATENTS

| | | |
|---|---|---|
| 2,128,662 | Nielson | Aug. 30, 1938 |
| 2,737,426 | Peterson | Mar. 6, 1956 |
| 2,795,468 | Venner et al. | June 11, 1957 |